Nov. 10, 1931. J. A. REECE 1,831,639
SHEET GLASS DRAWING APPARATUS
Filed July 30, 1927
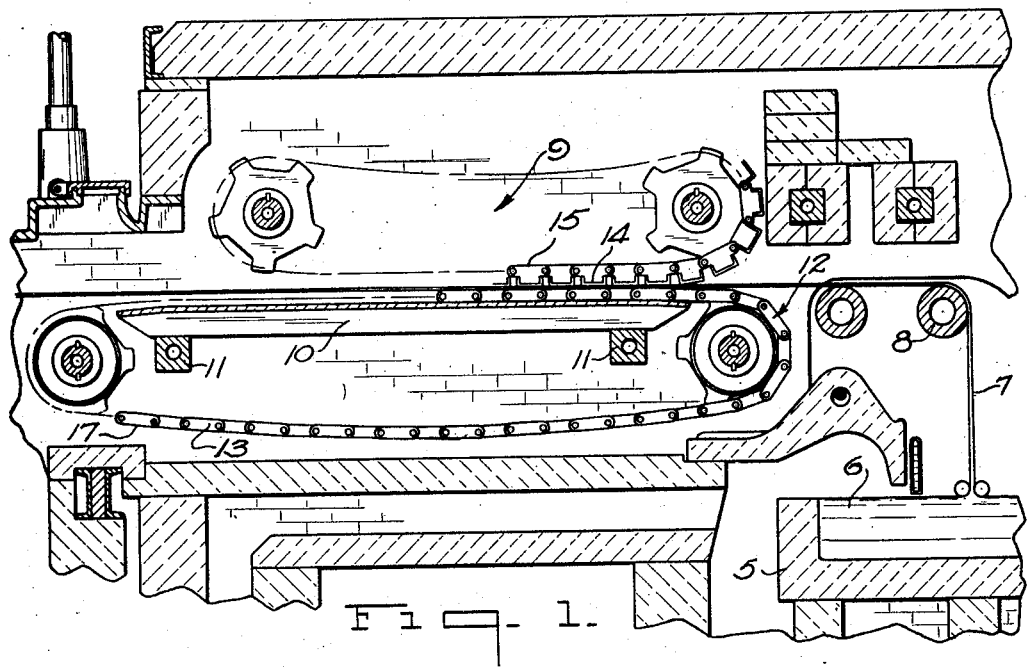
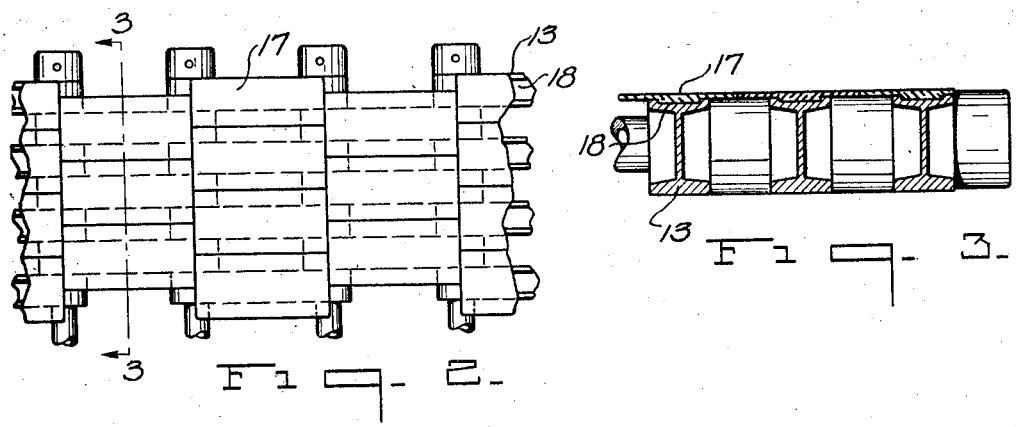
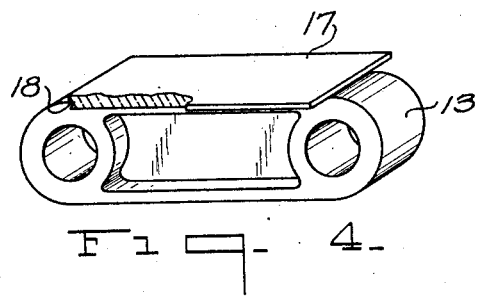
Inventor
Joseph A. Reece.
By Frank Fraser
Attorney Patented Nov. 10, 1931

1,831,639

UNITED STATES PATENT OFFICE

JOSEPH A. REECE, OF TOLEDO, OHIO, ASSIGNOR TO LIBBEY-OWENS-FORD GLASS COMPANY, OF TOLEDO, OHIO, A CORPORATION OF OHIO

SHEET GLASS DRAWING APPARATUS

Application filed July 30, 1927. Serial No. 209,612.

The present invention relates to sheet glass drawing apparatus, and has particular reference to an improved form of flattening or draw table for use in connection therewith.

This invention concerns a flattening or draw table of the construction disclosed in the patent to Colburn No. 1,248,809, wherein the said table is made up of a plurality of connected links arranged in an endless belt formation. Upon occasions marks appear in the glass sheet which are believed to be caused from either the links themselves or from the glass, while in a relatively plastic state, settling between the spaces formed by the links of the flattening table as the sheet is carried along thereby.

An important object of the present invention is to provide a draw table composed of a plurality of connected links having means associated therewith to prevent said links from marring the glass carried thereby.

Another object of the invention is to provide a draw table of improved construction composed of a plurality of connected links with means associated with said links for forming a substantially unbroken glass supporting surface.

A further object of the invention is to provide a draw table suitable for drawing and flattening glass, so constructed that the cost thereof will be materially reduced, this being accomplished by constructing the table proper of a relatively cheap material, while forming the portion with which the glass contacts of a different and suitable material which is usually more costly.

Other objects and advantages of the invention will become more apparent during the course of the following description when taken in connection with the accompanying drawings.

In the drawings wherein like numerals are employed to designate like parts throughout the same, Fig. 1 is a longitudinal vertical section through glass drawing apparatus showing the improved draw table associated therewith, Fig. 2 is a fragmentary plan view of the improved draw table, Fig. 3 is a section taken substantially on line 3—3 of Fig. 2, and Fig. 4 is a perspective view showing in detail one of the links which goes to make up the draw table.

The numeral 5 designates a pot containing a mass of molten glass 6 from which a sheet of glass 7 may be drawn vertically and deflected horizontally over the bending roll 8 by a drawing mechanism 9. The drawing mechanism 9 comprises the longitudinally extending draw table rails 10 mounted on transverse beams 11, and upon which is supported the upper run of the preferably endless draw table 12 formed of a plurality of connected links 13. Superimposed above the draw table is a plurality of transverse clamp bars 14 linked together by a chain 15. The glass sheet 7 rests upon and is drawn by the table 12, being clamped thereto by the ends of the clamp bars 14.

In accordance with the present invention, the links 13 of the draw table 12 are provided with face plates 17, one of these plates being preferably carried by each link and being secured thereto in any suitable manner such as by fitting the same within a recess 18 in said links as in Figs. 3 and 4. These face plates extend over the sides of the links, filling up the spaces therebetween as shown in the drawings, thus forming a substantially solid and unbroken surface upon which the glass sheet 7 may rest during its travel through the drawing mechanism. By providing such a substantially solid and unbroken surface for supporting the sheet, the said links will be prevented from contacting therewith and marring the same. Also, the sheet will be prevented from sagging down between the said links during its passage through the drawing mechanism.

In place of the structure shown in Fig. 4, the face plates may be made in one continuous slab, extending transversely of the table in place of individual sections for each link.

It is advisable when using a flattening table of the general character described that that the portions thereof with which the sheet contacts be of a non-corrosive metal whose structure is not materially affected when subjected to abnormal temperatures. Consequently, an advantage of the present invention is, the links themselves may be made of some cheap material such as cast-iron in place of the usual costly non-corrosive metal, monel, nichrome, or the like, while the face plates may be made of a suitable non-corrosive metal, thus materially reducing the cost of constructing a table of this kind. However, if desired, the face plates may be made of suitable material which will not mar or scratch the glass, such as clay, graphite, soapstone, asbestos, or the like.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In sheet glass drawing apparatus, a draw table comprising a plurality of links pivotally associated with one another in an overlapping and intermeshing relation to form a link belt conveyor, and individual face plates secured to the links and being of a greater width than the same whereby to fill up the spaces between said links to create a substantially unbroken surface upon which the glass sheet is adapted to rest.

2. In sheet glass drawing apparatus, a draw table comprising a plurality of links pivotally associated with one another in an overlapping and intermeshing relation to form a link belt conveyor, each of said links being provided with a recess, and individual face plates secured within said recesses and being of a width greater than the width of the respective individual links whereby to fill up the spaces between said links to create a substantially unbroken surface upon which the glass sheet is adapted to rest.

3. In sheet glass forming apparatus, a draw table composed of a plurality of links pivotally associated with one another to form a link belt conveyor, each having a recess therein extending longitudinally of the table, and an individual face plate secured within the recess of each link and extending transversely of the table beyond the sides of its respective link to form a substantially unbroken sheet engaging surface.

4. In sheet glass forming apparatus, a draw table composed of a plurality of substantially parallel rows of links extending longitudinally of the table, means for pivotally connecting the rows of links in endless belt formation, and individual face plates secured to the links and being of a greater width than the same whereby to fill up the spaces between said links to create a substantially unbroken surface for engagement with the glass sheet.

5. In sheet glass forming apparatus, a draw table composed of a plurality of substantially parallel rows of links extending longitudinally of the table, means for connecting the rows of links in endless belt formation, each of said links being provided with a recess, and individual face plates secured within said recesses and being of a width greater than the width of the respective individual links whereby to fill up the spaces between said links to create a substantially unbroken surface for engagement with the glass sheet.

Signed at Toledo, in the county of Lucas and State of Ohio, this 28th day of July, 1927.

JOSEPH A. REECE.